INVENTOR.
James A. Hogan

INVENTOR.
James A. Hogan
BY

United States Patent Office 3,413,561
Patented Nov. 26, 1968

3,413,561
PROCESS CONTROLLER INCLUDING AN
OPERATIONAL AMPLIFIER
James A. Hogan, Lansdowne, Pa., assignor to Honeywell
Inc., Minneapolis, Minn., a corporation of Delaware
Filed Oct. 22, 1964, Ser. No. 405,654
1 Claim. (Cl. 330—9)

ABSTRACT OF THE DISCLOSURE

A process controller including an operational amplifier having an output connected to control a process variable, having an input connected to a current summing junction to which is applied a process variable error signal, and having a negative feedback connection between its output and the summing junction including a reset capacitor. The differences between the reset capacitor signal and reference signals from a reference source are applied to diodes which, when those differences exceed predetermined values, pass a compensating signal through a damping resistor to the summing junction to oppose the reset signal and reduce the amplifier input signal, to prevent the unwanted accumulation of reset.

Figure 1:
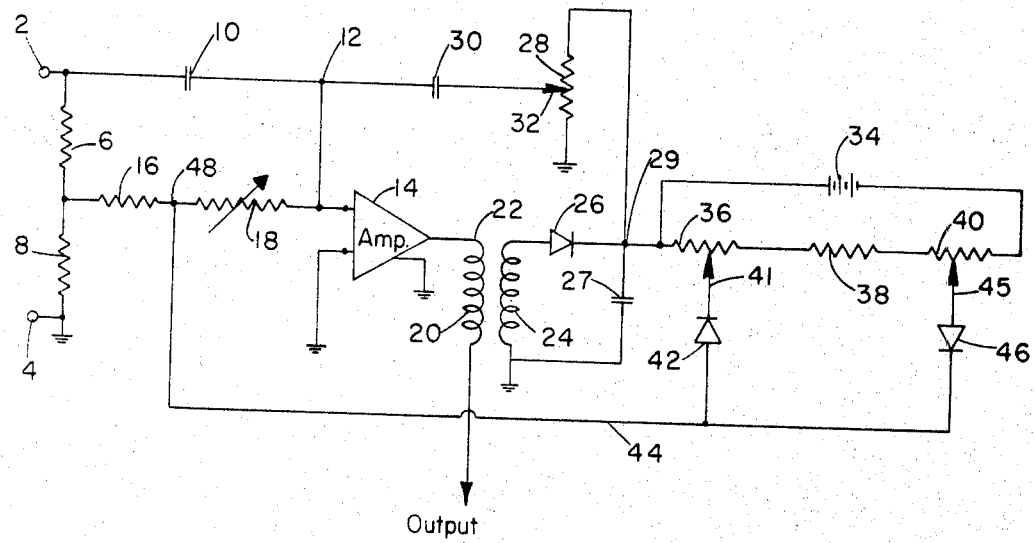

In the art relating to electronic control systems for the control of various industrial processes, the controllers frequently include a signal integrating function which is known in the art as "reset." The operation of the reset feature is to produce a characterization of the input signal which is a function both of the magnitude and duration of the deviation of the measured variable from a desired value or setpoint, since the integrating function is frequently very necessary in accomplishing the desired control action in maintaining proper control over an industrial process. There are circumstances, however, when the measured variable deviates widely from the setpoint value and for an extended period of time. Such a large deviation occurs, for example, when a process is being started up. Under such circumstances, the continued integration of the deviation signal works adversely to the proper control of the industrial process, especially when the deviation of the signal is not within the control range of the controller. That produces an undesirable accumulation of reset.

It is an object of this invention to provide an improved controller which includes automatic reset and features improved means for eliminating the undesirable reset accumulation.

It is another object of this invention to provide an improved controller as set forth wherein the means for eliminating the undesirable reset accumulation does not produce a control upset on the occurrence of a transient signal.

It is a still further object of the present invention to provide a controller as set forth which is extremely simple in construction and operation.

In accomplishing these and other objects, there has been provided, in accordance with the present invention, a controller circuit which includes an amplifier connected in negative feedback configuration having an input circuit and an output circuit with a negative feedback loop interconnecting them. Means are included in the feedback loop for providing a reset signal for the controller. A reference signal source is provided against which the output signal of the controller, or the reset signal, is compared. When the difference between the reference signal and the controller output or reset signal exceeds a predetermined amount, an appropriate compensating signal is applied to a point in an impedance network associated with the reset means to oppose the reset signal effectively reducing the controller input signal. The compensating signal from the reference source reduces the output of the controller amplifier and eliminates the further accumulation of reset until such time as the controller input signal has been established within the control range of the controller system. The inclusion of a portion of the resistive impedance of the associated circuit between the summing junction and the point of application of the compensating signal from the reference source provides a measure of damping whereby to avoid upsetting the control system upon the occurrence of a short term transient signal.

Figure 2:
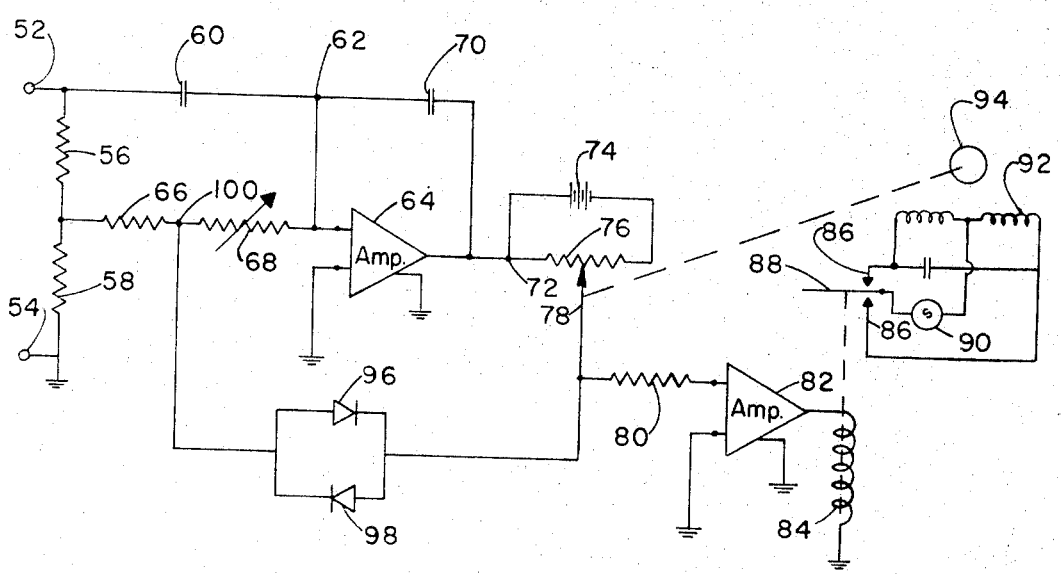
Figure 3:
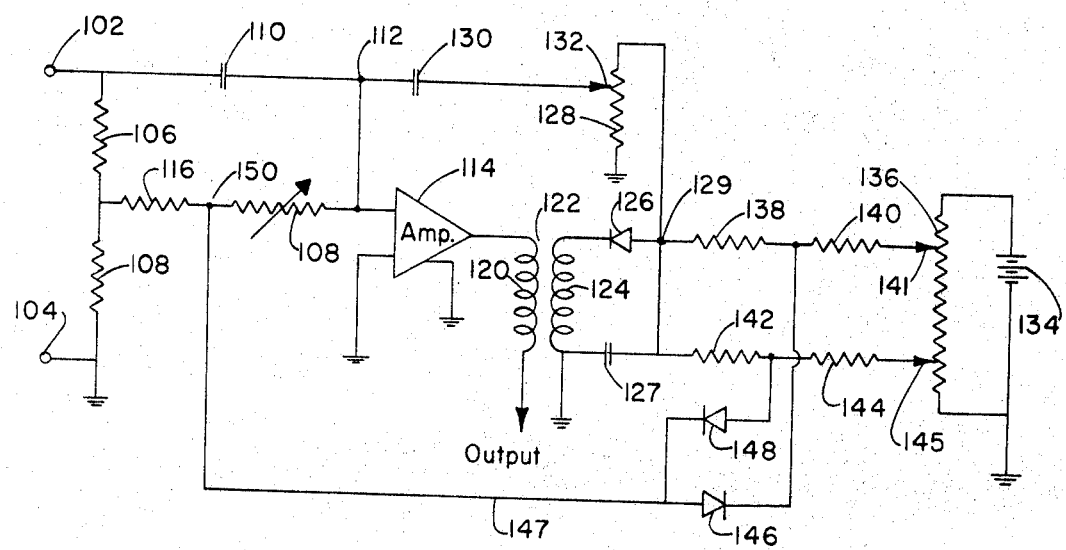
Figure 4:
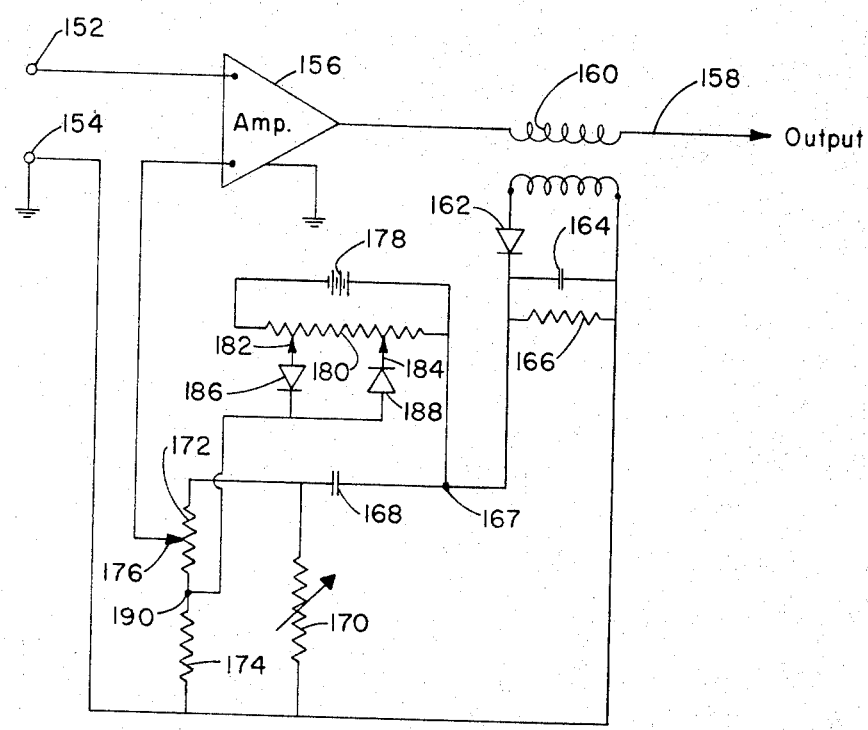

A better understanding of this invention may be had from the following detailed description when read in connection with the accompanying drawing in which FIG. 1 is a schematic diagram of a current proportioning controller embodying the present invention, FIG. 2 is a schematic diagram of a position proportioning controller also embodying the present invention, FIG. 3 is a schematic diagram of a circuit similar to that shown in FIG. 1 but including somewhat different circuitry yet also embodying the present invention, and FIG. 4 is a schematic diagram of a different controller configuration embodying the present invention.

Referring now to the drawing in more detail, it may be seen, in FIG. 1, that there has been provided a controller circuit having a first input terminal 2 and a second input terminal 4, the latter of which is connected to a point of fixed reference potential, or ground. Between the input terminals 2 and 4 there is connected a pair of serially arranged resistors 6 and 8. An input capacitor 10 is connected between the input terminal 2 and a summing junction 12. The summing junction 12 is connected to one of the input terminals of a high input impedance controller amplifier 14. From the junction between the resistors 6 and 8 to the summing junction 12, or the input terminal of the amplifier 14, there is connected a second serially arranged pair of resistors 16 and 18. The resistor 16 may be a fixed resistor while the resistor 18 is a variable resistor. The resistors 6, 8, 16 and 18 and the capacitor 10 are included in the controller input impedance network.

The output of the controller is taken from the output terminal of the amplifier 14 through a primary winding 20 of a current transformer 22 and applied directly to a current responsive load device (not shown). The secondary winding 24 of the transformer 22 is connected through a rectifying diode 26 and a shunt filter capacitor 27 to a feedback impedance network. The feedback impedance network includes a slidewire resistor 28 connected between the cathode of the diode 26 at the junction 29 and the point of reference potential, or ground. A feedback or reset capacitor 30 is connected between the summing junction 12 and the slider 32 operatively associated with the slidewire resistor 28. The controller as thus far described may be of the type shown and described in Newbold Patent 3,081,425 issued Mar. 12, 1963.

The junction 29 is also connected to a reference signal source. The reference signal source includes a floating voltage supply source represented in FIG. 1 by a battery 34. Connected in series with the voltage source 34 there is a first slidewire resistor 36, a fixed resistor 38 and a second slidewire resistor 40. The slider 41 associated with the resistor 36 is connected through an asymmetrically conductive device or diode 42 to a common feedback lead 44. Similarly, the slider 45 associated with the resistor 40 is connected to an asymmetrically conductive device or diode 46 to the feedback lead 44. The lead 44 is connected to a junction 48 between the resistor 16 and the variable resistor 18 in the input impedance network. Since the diode 26 in the feedback loop is oriented to produce only positive signals at the junction 29, the power supply of the reference source must be floating, that is, not referred to ground, thereby producing voltage summation at the sliders 41 and 45.

In operation, an error or deviation signal, that is, a signal representative of the difference between the measured process variable and the setpoint value, is applied across the input terminals 2 and 4 of the controller. Under relatively steady state conditions, the error signal is divided across the resistors 6 and 8 and the resultant signal is applied through the resistors 16 and 18 to the summing junction 12, and hence to the amplifier 14. One of the principal characteristics of an operational amplifier configuration as embodied in the controller here shown, is that the feedback signal from the output of the amplifier to the summing junction 12 is of such nature as to tend to reduce the signal potential at the summing junction to zero. This is particularly true when the amplifier is characterized by having a high open-loop gain. Such a configuration produces an extremely accurate output signal so long as the input signal is within the acceptable range of the amplifier. On the other hand, when the amplifier input signal exceeds the acceptable range of the amplifier, the amplifier becomes saturated and is incapable of supplying a feedback signal large enough to offset the input signal. Under such conditions the feedback or reset capacitor 30 is charged to a large value, commensurate with the input signal. Such charging of the capacitor 30 constitutes the earlier mentioned undesirable reset accumulation which may, under certain circumstances, produce a deleterious effect upon the control system. In order to overcome such a condition, the output signal of the amplifier 14, as represented by the feedback signal taken at the junction 29 which is effectively the reset signal developed on the capacitor 30, is compared to the signals from the reference signal source. If the magnitude of the feedback or reset signal is such as to lie between the value of the reference signal produced at the slider 41 and that produced at the slider 45 then the diodes 42 and 46 block the transmission of any compensating signal along the lead 44 to the junction 48. This, of course, does not interfere with the normal operation of the conventional feedback to the summing junction 12 through the slidewire resistor 28 and the capacitor 30.

On the other hand, if the input signal to the controller is such that the output signal of the amplifier represented by the voltage at the junction 29 is either less than the reference signal at the slider 41 or greater than the reference signal at the slider 45, then a corresponding compensating signal is applied through the appropriate one of the two diodes 42 or 46 through the lead 44 to the junction 48. This compensating signal is in a direction to oppose the reset signal, effectively reducing the input signal and, hence, maintain the input signal to the amplifier within the control range of the amplifier.

While it is apparent that this compensating signal applied through the lead 44 could be applied directly to the summing junction 12, hence, directly to the input of the amplifier 14 and thus effectively oppose the input signal, such a connection produces an undesirable side effect. Such a connection would produce a control upset as a result of the occurrence of a momentary transient signal. For example, assume that the controller is operating under a normal control condition with the signals well within the control range of the controller. Under such conditions there will be a charge established on the capacitor 30 which is necessary to the proper operation of the controller. A very brief transient signal of short duration ordinarily will not adversely influence the operation of the controller. However, if the lead 44 were connected directly to the summing junction 12 the instantaneous compensating signal resulting from the transient pulse would cause an instantaneous discharge of the capacitor 30. Such a discharge of the capacitor 30 would then introduce a spurious control influence on the output of the controller during that interval required for the capacitor 30 to reestablish the desired condition of charge after the passing of the transient pulse. Since the capacitor 30 must recharge through the resistor 18, the resistor 16, and the resistor 8, the duration of the spurious control influence could be substantial. Under similar conditions but with the lead 44 connected to the junction 48 as shown in FIG. 1, the inclusion of the resistor 18 between the point of the application of the compensating signal and the capacitor 30 introduces a time-constant factor which is effective to provide sufficient damping to avoid the undesired dumping discharge of the capacitor 30. The inclusion of the resistor 18 between the point of application of the compensating signal and the input to the amplifier 14 does not adversely effect the purpose of the compensating signal in controlling the unwanted accumulation of the reset. In this configuration, the compensating signal applied to the junction 48 is effectively in opposition to the reset signal.

It will be apparent, of course, that it is the signal which is in excess of the normal control values which will be fed back along the lead 44 to the input of the amplifier 14. The output signal to the load from the amplifier will still be of such magnitude as to tend to bring the measured variable signal representative of the controlled process up to the setpoint value. It will further be apparent that, as the measured variable approaches the setpoint value and the deviation signal falls within the predetermined control range, the compensating signal from the reference source drops out and the controller carries on its normal control function.

In FIG. 2 there is shown a similar controller connected in a position-proportioning arrangement. That is, the output of the controller is applied to energize a relay which, in turn, causes a control motor to be driven in one direction or the other, depending upon the polarity of the energization of the relay, and for the duration that the relay is closed. Such a motor may, for example, be a valve positioning motor. The motor also drives the slider of a retransmitting slidewire, the position of the slider at any instant being representative of the relative position of the control instrumentality driven by the motor. To this end, there is shown in FIG. 2 a controller circuit in an operational amplifier configuration and which includes a first input terminal 52 and a second input terminal 54. A pair of resistors 56 and 58 are serially connected between the terminals 52 and 54. An input capacitor 60 is connected between the input terminal 52 and a summing junction 62. The summing junction 62 is, in turn, connected to one of the input terminals of a high input impedance controller amplifier 64. From the junction between the resistors 56 and 58 to the summing junction 62, or the input terminal of the amplifier 64, there is connected a second serially arranged pair of resistors 66 and 68. The resistor 66 may be a fixed resistor while the resistor 68 is shown as a variable resistor. As in the circuit illustrated in FIG. 1, the resistors 56, 58, 66, and 68 and the capacitor 60 are included in the controller input impedance network.

A feedback or reset capacitor 70 is connected between an output terminal of the amplifier 64 and the summing junction 62. The output of the amplifier is also connected, at a junction 72 to a reference signal source. The reference signal source includes floating voltage supply source represented, in FIG. 2, by a battery 74. Connected in series with the battery 74 there is a slidewire resistor 76. A slider contact 78 is operatively associated with the slidewire resistor 76. The slider is connected through a coupling resistor 80 to the input of a relay driver amplifier 82. The output of the amplifier 82 is applied to the relay represented by the coil 84. A pair of fixed relay contacts 86 are positioned for selective engagement by a movable contact 88 under the influence of the signal applied to the relay coil 84. The relay contacts 86 and 88 are arranged to selectively and reversibly interconnect an alternating current power source 90 to the windings 92 of a two-phase reversible servo motor 94. The capacitor 94 provides the desired phase shift of the power source.

The slider 78 is also connected through a pair of parallelly connected, oppositely directed asymmetrically conductive diodes 96 and 98, respectively, to a junction 100 between the resistors 66 and 68 in the input impedance network.

In operation, an error signal representative of the differences between a measured variable and a setpoint value is applied to the input terminals 52 and 54. As in the case of the controller in FIG. 1, the error signal causes a signal to be applied to the input of the amplifier 64. The effective output of the amplifier at the junction 72 is compared in magnitude with the reference signal between the junctions 72 and the slider 78 operating along a slidewire 76. The algebraic sum of these signals is applied, through the resistor 80, to the input of the relay driver amplifier 82. If the effective output signal from the amplifier 64, as applied to the junction 72, is not substantially equal to the reference signal appearing between the junction 72 and the slider 78, then a difference signal will be applied to the input of the amplifier 82. That difference signal will cause the relay 84 to be actuated in one direction or the other, depending upon the polarity of the difference signal. This will cause the moveable contact 88, which is normally out of engagement with both of the fixed contacts 86, to be moved into engagement with one or the other of these fixed contacts 86, again depending upon the polarity of the difference signal applied to the input of the amplifier 82. This selective closing of the relay contacts 88 and 86 causes the motor windings 92 to be energized from the alternating current source 90. In response thereto, the motor 94 rotates in such a direction as to cause the slider 78 to be moved along the slidewire 76 to a position whereat the voltage signal between the slider 78 and the junction 72 is substantially equal to the effective output of the controller amplifier 54. When the signals have reached equilibrium, the relay contact 88 moves to its neutral position and stops the driving of the motor. At the same time that the motor 94 was moving the slider 78 along the sildewire 76, it was, of course, changing the position of a control element such as a valve (not shown) in the process which is being controlled.

So long as the signals applied to the controller are within the control range of the system, the motor 94 will cause the slider 78 to move along the slidewire resistor 76 to a position whereat the net signal appearing at the slider 78 is very close to zero. When the error signal applied to the input of the controller is of such magnitude as to lie beyond the control range of the system, such a condition as might be encountered during a batch start-up of an industrial process, the motor 94 will be activated in a direction to drive the slider 78 to one extreme end of the slidewire resistor 76 or the other, depending upon the polarity of the error signal. Under these conditions, the amplifier 64 would tend to be saturated to the degree that the feedback to the junction 62 would not be able to reduce that potential effectively to zero. If such a condition exists, the capacitor 70 would accumulate a reset charge which would again have a deleterious effect upon the control system. As in the case of the circuit shown in FIG. 1, however, when the error signal is beyond the control range of the system and the slider 78 is at one extreme or the other of the slidewire resistor 76, the excess potential developed at the slider 78 is transmitted through one or the other of the two diodes 96 or 98 to the junction 100. The signal thus transmitted to the junction 100 is in a direction to oppose the reset signal thereby effectively reducing the input signal to the amplifier 64 and, accordingly, preventing the undesired reset accumulation at the capacitor 70. Again, as in the circuit of FIG. 1, the inclusion of the impedance of the resistors 68 between the junction 100, the junction 62 allows the system to operate without the undesired accumulation of reset in the capacitor 70, but at the same time prevents an equally undesired dumping of the charge of the capacitor 70 upon the occurrence of a short-term transient signal.

In FIG. 3 there is shown a controller circuit which is very similar to that shown in FIG. 1 but with a difference in the output configuration. The controller, again in the operational amplifier configuration, includes a pair of input terminals 102 and 104. Between these terminals there is serially connected a pair of resistors 106 and 108. An input capacitor 110 is connected between the input terminal 102 and a summing junction 112. The other input terminal 104 is connected to a point of fixed reference potential, or ground. The summing junction 112 is connected to one of the input terminals of a high input impedance controller amplifier 114. From the junction between the resistors 106 and 108 to the summing junction 112, or the input terminal of the amplifier 114, there is connected a second serially arranged pair of resistors 116 and 118. The resistor 116 may be a fixed resistor while the resistor 118 is a variable resistor. The resistors 106, 108, 116, and 118 and the capacitor 110 are included in the controller input impedance network.

The output of the controller is taken from the output terminal of the amplifier 114 through a primary winding 120 of a current transformer 122 and applied directly to a current responsive load device (not shown). The secondary winding 124 of the transformer 122 is connected through a rectifying diode 126 and a shunt filter capacitor 127 to a feedback impedance network. The feedback impedance network includes a slidewire resistor 128 connected between the anode of the diode 126 at the junction 129 and a point of reference potential, or ground. A feedback capacitor 130 is connected between the summing junction 112 and the slider 132 operatively associated with the slidewire resistor 128.

The junction 129 is also connected to a reference signal source. The reference signal source includes a voltage supply source as represented in FIG. 3 by a battery 134. Connected in series with the voltage source 134, there is a slidewire resistor 136. A first pair of matched resistors 138 and 140 are serially connected between the junction 129 and a first slider 141 operatively associated with the slidewire resistor 136. A second pair of matched resistors 142 and 144 are serially connected between the junction 129 and a second slider 145 also operatively associated with the slidewire resistor 136. The junction between the resistors 138 and 140 is connected through a first asymmetrically conductive diode 146 to a compensation signal lead 147. Similarly, the junction between the resistors 142 and 144 is connected through a second asymmetrically conductive diode 148 to the lead 147. The lead 147 is, in turn, connected to the junction 150 between the resistors 116 and 118 in the input impedance network of the amplifier 114.

As previously mentioned the controller circuit illustrated in FIG. 3 is substantially identical to that shown in FIG. 1 and operates in substantially the same manner. The principal difference lies in that, in FIG. 3, the diode 126 in the feedback network is reversed in polarity with respect to the comparable diode 26 in the circuit of FIG. 1. Whereas, in FIG. 1, the feedback signal developed at the junction 29, with resepct to ground, is positive; in FIG. 3, the signal developed at the junction 129, with respect to the ground, is negative. Again referring to FIG. 1, because the feedback signal developed at the junction 29 was positive with respect to ground, the reference source represented by the battery 34 is floating with respect to ground. Accordingly, the comparison of the signal at the junction 29 with the reference signal is by way of voltage summation at the sliders along the associated slidewire resistors. Since the reference source 34 must be floating with respect to ground, an auxiliary reference source must be provided. On the other hand, in the circuit illustrated in FIG. 3, the signal developed at the junction 129 is negative with respect to ground. Under these conditions, the reference source represented by battery 134 may have its negative terminal grounded without the danger of introducing spurious signals by way of so-called ground loops. Under these circumstances, the reference source may be the same power supply which is employed to energize the amplifier 114. Again, the pairs of resistors 138–140 and 142–144 provide for a comparison of the signal developed at the junction 129 with the reference signals but by way of current summing at each of the junctions between the aforesaid resistor pairs. Here, too, so long as the signal developed at the junction 129 lies between the high and low limits established by the position of the sliders 141 and 145 on the slidewire resistor 136, the controller operates in a normal manner with no compensating signal being applied to the junction 150 by way of the diodes 146 and 148. When, however, the signal developed at the junction 129 lies beyond either of the limits established by the sliders 141 and 145, a compensating signal representative of the excess is passed by the appropriate one of the two diodes 146 or 148 to the junction 150 in opposition to the reset signal. This, again, reduces the signal tending to impose an excessive reset charge on the capacitor 130. The presence of the impedance between the junction 150 and the capacitor 130 again obviates the probability of dumping the charge on the capacitor 130 on the occurrence of a short term transient signal.

The circuit shown in FIG. 4 is a controller of a somewhat different structure from that shown in FIGS. 1, 2 and 3. Whereas in FIGS. 1, 2 and 3 the normal feedback to the input of the amplifier was accomplished by way of current summing at the summing junction, in the circuit illustrated FIG. 4 the normal feedback signal is accomplished by way of voltage summation. There is provided a first input terminal 152 and a second input terminal 154 the latter of which may be connected to a point of fixed reference potential, or ground. The terminal 152 is directly connected to an input terminal of the controller amplifier 156. The output of the amplifier 156 is applied to the lead 158 through the primary winding of a current transformer 160. The secondary winding of the transformer 160 supplies a signal to a feedback loop around the amplifier 156. One terminal of the secondary winding is connected directly to the controller input terminal 154 which, as previously mentioned, may be connected to a point of fixed reference potential, or ground. The other terminal of the secondary winding of the transformer 60 is connected to a rectifying diode 162, past a filter including the capacitor 164 and parallel resistor 166, to a junction 167, thence through a signal characterizing network to the other input terminal of the amplifier 156. The signal characterizing network includes a reset 168 serially connected in the ungrounded feedback lead, a variable reset resistor 170 connected in shunt across the feedback leads, a proportional band slidewire resistor 172 and a bias resistor 174 connected in series with each other across the feedback leads, in parallel with the reset resistor 120. A slider 176 operatively associated with the slidewire resistor 172 is connected directly to the other input terminal of the amplifier 156. At the junction 167 there is also connected one terminal of a reference signal source. The reference signal source includes a reference power supply represented by the battery 178, a slidewire resistor 180 connected in series across the terminals of the power supply 178, a first slider 182 cooperatively associated with the slidewire resistor 180 and a second slider 184 also cooperatively associated with the slidewire resistor 180. A first asymmetrically conductive diode 186 is serially connected between the slider 182 and the junction 190 between the resistor 172 and the resistor 174. A second asymmetrically conductive diode 188 is serially connected between the slider 184 and the junction 190.

So long as the input signal applied to the terminals 152 and 154, representative of the deviation of the measured variables from the setpoint value, falls within the acceptable range of a controller, the controller will function normally. The output signal to a utilization device will be applied along the lead 158 through the primary winding of the transformer 160. Whenever there is a change in the current through the current transformer 160 in response to variations in a measured condition, the corresponding change in voltage across the feedback leads is fed through the reset capacitor 168 and, initially, appears across the variable resistor 170 and the series connected resistors 172 and 174. A portion of this voltage is coupled from the slider 176 to the input of the amplifier 156. This feedback voltage serves as a rebalancing signal and is connected in series opposition to the deviation signal applied at the input terminals 152 and 154. As the reset capacitor 168 gradually charges through the resistors 170, 172, and 174, the rebalancing signal produced at the input of the amplifier gradually drops off and thereby tends to increase the control action of the utilization device. The decreasing feedback signal results, accordingly, in an increasing output signal. This is in accordance with the well known characteristics of reset action. Of course, it must be remembered that, as the output signal is increasing, the instrumentality controlled thereby is being moved in a direction to decrease the deviation signal applied to the input terminals 152 and 154. On the other hand, when the situation is such that a large deviation signal persists for a considerable length of time, a large charge would be accumulated on the capacitor 168 which would, again, have a deleterious effect upon the control action of the controller. To overcome this, the charge across the capacitor with respect to ground, as seen at the junction 167, is compared with the high and low limits established at the sliders 182 and 184 of the reference signal source. When the potential at the junction 167 exceeds the potential established at the slider 182, the excess signal is passed by the diode 186 to the junction 190 between the resistors 172 and 174, thereby producing a signal at the slider 176 which opposes the reset accumulating signal, thereby opposing the input signal applied to the amplifier 156. This, in turn, reduces the output of the amplifier 156 to the predetermined safe limits. Similarly, when the charge across the capacitor 168 measured at the junction 167 falls below the low limit established at the slider 184, the excess signal is passed by the diode 188 to the junction 190, and, thence, to the input to the amplifier 156, as before, offsetting the input signal condition which produced the defect. As in the previous cases, the inclusion of the resistor 172 between the junction 190 and the capacitor 168 provides a sufficient damping action to obviate the undesirable dumping of the charge on the capacitor 168 on the occurrence of a short term transient signal.

Thus it may be seen that there has been provided, in accordance with the present invention, an improved controller which includes automatic reset and features improved means for eliminating undesirable reset accumulation and yet provides means for avoiding an undesirable control upset on the occurrence of a transient signal.

What is claimed is:

1. A process controller comprising an amplifier having a pair of input terminals and a pair of output terminals, a pair of error terminals for connection to a source of a deviation signal representative of the difference between a measured value of a process variable and a setpoint value of said variable, an impedance element network connecting said error terminals to said input terminals to apply at least a portion of said deviation signal to said input terminals, said network including a pair of resistors effectively connected in series between one of said error terminals and one of said input terminals, the other of said error terminals and the other of said input terminals being connected to a common reference point, a controller reset-producing capacitor connected in a negative feedback connection between said one of said input terminals and one of said output terminals to form an operational amplifier configuration, said one of said input terminals thereby constituting a summing junction, said output terminals being connected to means for affecting the value of said variable, and a reference signal source and a breakdown device connected in series between said one output terminal and the junction between said series-connected resistors to pass a reset-limiting signal to the last-mentioned junction when a signal at said one output terminal differs from a reference signal from said source by a predetermined amount.

References Cited
UNITED STATES PATENTS

| | | | |
|---|---|---|---|
| 3,219,936 | 11/1965 | Eksten et al. | 328—1 X |
| 3,058,068 | 10/1962 | Hinrichs et al. | 330—110 |
| 3,153,152 | 10/1964 | Hoffman | 330—110 X |
| 3,197,711 | 7/1965 | Richardson | 330—110 X |

NATHAN KAUFMAN, *Primary Examiner.*